(12) United States Patent
An et al.

(10) Patent No.: US 11,418,693 B2
(45) Date of Patent: Aug. 16, 2022

(54) VEHICLE AND METHOD OF CONTROLLING THE SAME

(71) Applicants: Hyundai Motor Company, Seoul (KR); Kia Motors Corporation, Seoul (KR)

(72) Inventors: Junsik An, Seoul (KR); Hayeon Lee, Gwacheon-si (KR); Jongmo Kim, Goyang-si (KR); Jinwook Choi, Seoul (KR); Minsung Son, Gwacheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/934,857

(22) Filed: Jul. 21, 2020

(65) Prior Publication Data
US 2021/0185205 A1    Jun. 17, 2021

(30) Foreign Application Priority Data

Dec. 12, 2019 (KR) .......................... 10-2019-0166111

(51) Int. Cl.
| | |
|---|---|
| *B60R 1/00* | (2022.01) |
| *G01C 21/30* | (2006.01) |
| *G01S 15/86* | (2020.01) |
| *G01S 15/931* | (2020.01) |
| *G06K 9/00* | (2022.01) |
| *H04N 5/232* | (2006.01) |
| *H04N 7/18* | (2006.01) |
| *H04N 5/262* | (2006.01) |
| *G06V 20/58* | (2022.01) |

(52) U.S. Cl.
CPC ............... *H04N 5/232* (2013.01); *B60R 1/00* (2013.01); *G01C 21/30* (2013.01); *G01S 15/86* (2020.01); *G01S 15/931* (2013.01); *G06V 20/586* (2022.01); *H04N 5/2628* (2013.01); *H04N 7/18* (2013.01); *B60R 2300/105* (2013.01); *B60R 2300/20* (2013.01); *B60R 2300/607* (2013.01); *B60R 2300/806* (2013.01); *G01S 2015/932* (2013.01)

(58) Field of Classification Search
None
See application file for complete search history.

(56) References Cited

U.S. PATENT DOCUMENTS

2017/0355307 A1* 12/2017 Ha .......................... H04N 7/183

* cited by examiner

*Primary Examiner* — Patricia I Young
(74) *Attorney, Agent, or Firm* — Slater Matsil, LLP

(57) ABSTRACT

A vehicle includes a camera unit disposed in the vehicle to have a plurality of channels and configured to obtain an image around the vehicle, the camera unit including one or more cameras, a sensing device including an ultrasonic sensor, the sensing device configured to obtain distance information between an object and the vehicle, and a controller configured to match a part of the image around the vehicle with at least one mask, form map information based on the at least one mask and the distance information, determine at least one control point based on the map information, and obtain the image around the vehicle based on a priority of the camera unit corresponding to a surrounding type of the vehicle determined based on the control point.

20 Claims, 10 Drawing Sheets

VEHICLE AND METHOD OF CONTROLLING THE SAME

CROSS-REFERENCE TO RELATED APPLICATIONS

This application claims the benefit of Korean Patent Application No. 10-2019-0166111, filed on Dec. 12, 2019 in the Korean Intellectual Property Office, which application is hereby incorporated herein by reference.

TECHNICAL FIELD

The disclosure relates to a vehicle for recognizing an image around the vehicle, and a method of controlling the vehicle.

BACKGROUND

An autonomous driving technology of a vehicle is a technology in which the vehicle grasps a road condition and automatically drives even if a driver does not control a brake, a steering wheel, or an accelerator pedal.

The autonomous driving technology is a core technology for smart car implementation. For autonomous driving, the autonomous driving technology may include highway driving assist (HDA, a technology that automatically maintains a distance between vehicles), blind spot detection (BSD, a technology that detects surrounding vehicles during reversing and sounds an alarm), autonomous emergency braking (AEB, a technology that activates a braking system when the vehicle does not recognize a preceding vehicle), lane departure warning system (LDWS), lane keeping assist system (LKAS, a technology that compensates for departing the lane without turn signals), advanced smart cruise control (ASCC, a technology that maintains a constant distance between vehicles at a set speed and drives at a constant speed), traffic jam assistant (TJA), parking collision-avoidance assist (PCA), and remote smart parking assist (RSPA).

In particular, the RSPA system uses only an ultrasonic sensor for a parking space recognition, so it is possible to perform automatic parking by generating a control trajectory only when the vehicle is nearby.

In order to increase the completeness of the parking space without the vehicle or a parking arrangement, there is a need for a recognition system that recognizes lane types outside the vehicle and transmits the lane types to a control system.

SUMMARY

An aspect of embodiments of the disclosure provides a vehicle capable of efficient autonomous parking by changing a recognition area of a camera according to a type of parking, and a method of controlling the vehicle.

Additional embodiments of the disclosure will be set forth in part in the description which follows and, in part, will be obvious from the description, or may be learned by practice of the disclosure.

In accordance with an embodiment of the disclosure, a vehicle includes a camera disposed in a vehicle to have a plurality of channels and configured to obtain an image around the vehicle, a sensing device including an ultrasonic sensor and configured to obtain distance information between an object and the vehicle, and a controller configured to match a part of the image around the vehicle with at least one mask, to form map information based on the at least one mask and the distance information, to determine at least one control point based on the map information, and to obtain the image around the vehicle based on a priority of the camera corresponding to a surrounding type of the vehicle determined based on the control point.

The map information may include the distance information corresponding to pixels of the image around the vehicle.

The controller may be configured to convert the image around the vehicle to a vehicle coordinate system to match with the at least one mask.

The controller may be configured to determine the surrounding type of the vehicle through learning of the image around the vehicle.

When performing longitudinal parking on a side of the vehicle, the controller may be configured to assign the priority to the channel on the side of the vehicle among the plurality of channels.

When performing reverse diagonal parking of the vehicle, the controller may be configured to assign the priority to the channel in front of the vehicle among the plurality of channels.

When performing forward diagonal parking of the vehicle, the controller may be configured to assign the priority to the channel on the side of the vehicle among the plurality of channels.

When performing rear parking of the vehicle, the controller may be configured to assign the priority to the channel behind the vehicle among the plurality of channels.

The controller may be configured to change the priority in real time in response to driving of the vehicle.

The vehicle may further include a display. The controller may be configured to form a top view image based on the map information of the vehicle, to form a boundary line on the top view based on priority information and output the boundary line to the display.

In accordance with another aspect of the disclosure, a method of controlling a vehicle includes obtaining, by a camera having a plurality of channels, an image around the vehicle, obtaining, by a sensing device, distance information between an object and the vehicle, matching, by a controller, a part of the image around the vehicle with at least one mask, forming, by the controller, map information based on the at least one mask and the distance information, determining, by the controller, at least one control point based on the map information, and obtaining, by the controller, the image around the vehicle based on a priority of the camera corresponding to a surrounding type of the vehicle determined based on the control point.

The map information may include the distance information corresponding to pixels of the image around the vehicle.

The matching of the part of the image around the vehicle with the at least one mask may include converting the image around the vehicle to a vehicle coordinate system to match with the at least one mask.

The obtaining of the image around the vehicle may include determining the surrounding type of the vehicle through learning of the image around the vehicle.

The obtaining of the image around the vehicle may include giving the priority to the channel on the side of the vehicle among the plurality of channels when performing longitudinal parking on a side of the vehicle.

The obtaining of the image around the vehicle may include giving the priority to the channel in front of the vehicle among the plurality of channels when performing reverse diagonal parking of the vehicle.

The obtaining of the image around the vehicle may include giving the priority to the channel on the side of the vehicle among the plurality of channels when performing forward diagonal parking of the vehicle.

The obtaining of the image around the vehicle may include giving the priority to the channel behind the vehicle among the plurality of channels when performing rear parking of the vehicle.

The method may further include changing, by the controller, the priority in real time in response to driving of the vehicle.

The method may further include forming, by the controller, a top view image based on the map information of the vehicle, and forming, by the controller, a boundary line on the top view based on priority information and outputting the boundary line to the display.

BRIEF DESCRIPTION OF THE DRAWINGS

These and/or other aspects of the disclosure will become apparent and more readily appreciated from the following description of the embodiments, taken in conjunction with the accompanying drawings, in which.

DETAILED DESCRIPTION OF ILLUSTRATIVE EMBODIMENTS

Like reference numerals refer to like elements throughout the specification. Not all elements of the embodiments of the disclosure will be described, and the description of what are commonly known in the art or what overlap each other in the embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be further understood that the term "connect" and its derivatives refer both to direct and indirect connection, and the indirect connection includes a connection over a wireless communication network. The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise. Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to accompanying drawings.

Figure 1:
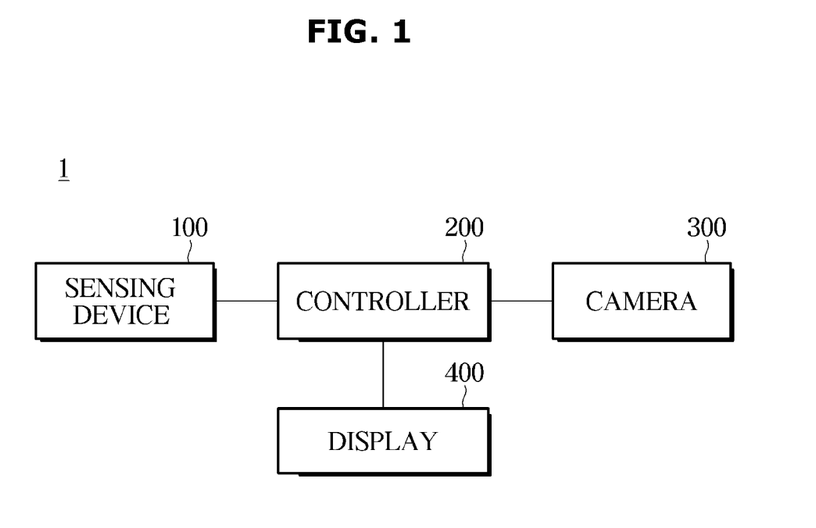
FIG. 1 is a control block diagram according to an embodiment.

FIG. 1 is a control block diagram according to an embodiment.

Referring to FIG. 1, a vehicle 1 according to an embodiment may include a camera unit 300, a sensing device 100, a display 400, and a controller 200.

The camera unit 300 can include one or more cameras 300. The camera unit 300 has a plurality of channels and may obtain images around the vehicle 1. Hereinafter, the term "camera 300" may refer to the camera unit or an individual camera or cameras of the camera unit.

The camera(s) 300 installed in the vehicle 1 may include a charge-coupled device (CCD) camera or a CMOS color image sensor. Here, both the CCD and the CMOS refer to a sensor that converts light received through the lens of the camera 300 into an electric signal and stores the electric signal.

The sensing device 100 may include an ultrasonic sensor.

The ultrasonic sensor may employ a method of transmitting ultrasonic waves and detecting a distance to an obstacle using ultrasonic waves reflected on the obstacle.

The sensing device 100 may obtain distance information of the vehicle 1 and the obstacle provided around the vehicle 1.

The display 400 may be provided as an instrument panel provided in the vehicle 1 or a display device provided in a center fascia.

The display 400 may include cathode ray tubes (CRTs), a digital light processing (DLP) panel, a plasma display panel (PDP), a liquid crystal display (LCD) panel, an electro luminescence (EL) panel, an electrophoretic display (EPD) panel, an electrochromic display (ECD) panel, a light emitting diode (LED) panel or an organic light emitting diode (OLED) panel, but is not limited thereto.

The controller 200 may match a part of an image around the vehicle 1 with at least one mask. That is, the obstacle, a floor, or the like displayed in the image may be matched to a corresponding mask.

The controller 200 may form map information based on the at least one mask and the distance information.

The map information may refer to information including the distance information between the vehicle 1 and the surrounding obstacle.

The controller 200 may obtain the image around the vehicle 1 based on the priority of the camera 300 corresponding to the surrounding type of the vehicle 1 determined based on the map information.

The surrounding type may refer to a relationship between the vehicle 1 and the obstacle, and a relationship between the vehicle 1 and a road.

The priority may refer to information related to a recognition area of the camera 300.

The map information may include the distance information corresponding to pixels of the image around the vehicle 1. That is, the map information may be provided as information matching the distance between the vehicle 1 and the obstacle and the pixels of the image around the vehicle 1.

The controller 200 may convert the image around the vehicle 1 into a vehicle coordinate system to correspond to the at least one mask.

That is, the controller 200 may obtain the image around the vehicle 1 with a coordinate system centered on the camera 300, but the controller 200 may convert the image around the vehicle 1 into the coordinate system of the vehicle itself to form the map information.

The controller 200 may determine the surrounding type of the vehicle 1 through learning of the image around the vehicle 1.

The learning performed by the controller 200 may be performed through deep learning.

The deep learning is a field of machine learning, and may refer to a form of expressing data as a vector or a graph, which can be processed by a computer and building a model for learning data.

The model of deep learning may be formed based on a neural network, and in particular, the model of deep learning may be formed by building up the model by stacking multiple layers of neural networks.

When performing longitudinal parking on a side of the vehicle 1, the controller 200 may assign the priority to the channel on the side of the vehicle 1 among the plurality of channels.

When performing reverse diagonal parking of the vehicle 1, the controller 200 may assign the priority to the channel in front of the vehicle 1 among the plurality of channels.

When performing forward diagonal parking of the vehicle 1, the controller 200 may assign the priority to the channel on the side of the vehicle 1 among the plurality of channels.

When performing rear parking of the vehicle 1, the controller 200 may assign the priority to the channel behind the vehicle 1 among the plurality of channels.

The controller 200 may change the priority in real time in response to driving of the vehicle 1.

The priority of the camera 300 changed in response to parking of the above-described vehicle 1 will be described in detail below.

The controller 200 may form a top view image based on the map information of the vehicle 1, and may form a boundary line in the top view based on priority information to output it to the display 400.

The boundary formed in the top view may refer to the recognition area of each of the cameras 300.

The controller 200 may be implemented with a memory storing an algorithm to control operation of the components in the vehicle 1 or data about a program that implements the algorithm, and a processor carrying out the aforementioned operation using the data stored in the memory. The memory and the processor may be implemented in separate chips. Alternatively, the memory and the processor may be implemented in a single chip.

At least one component may be added or deleted corresponding to the performance of the components of the vehicle 1 illustrated in FIG. 1. It will be readily understood by those skilled in the art that the mutual position of the components may be changed corresponding to the performance or structure of the vehicle 1.

In the meantime, each of the components illustrated in FIG. 1 may be referred to as a hardware component such as software and/or a field programmable gate array (FPGA) and an application specific integrated circuit (ASIC).

Figure 2:
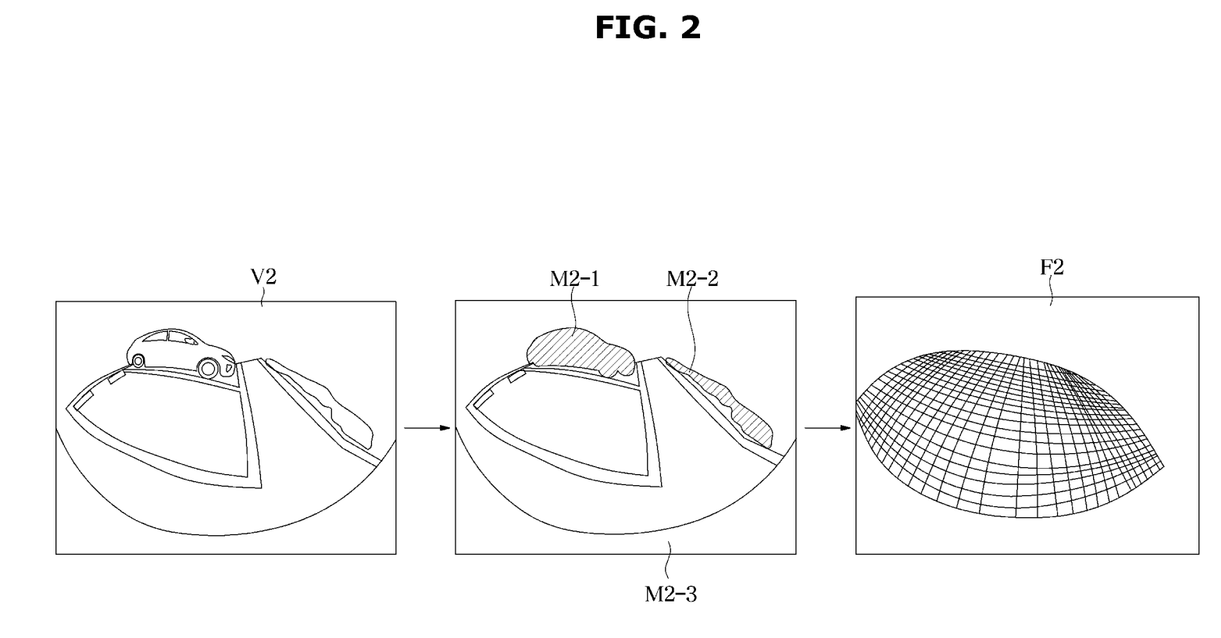
FIG. 2 is a view for describing an operation of determining map information based on an image around a vehicle according to an embodiment.
Figure 3:
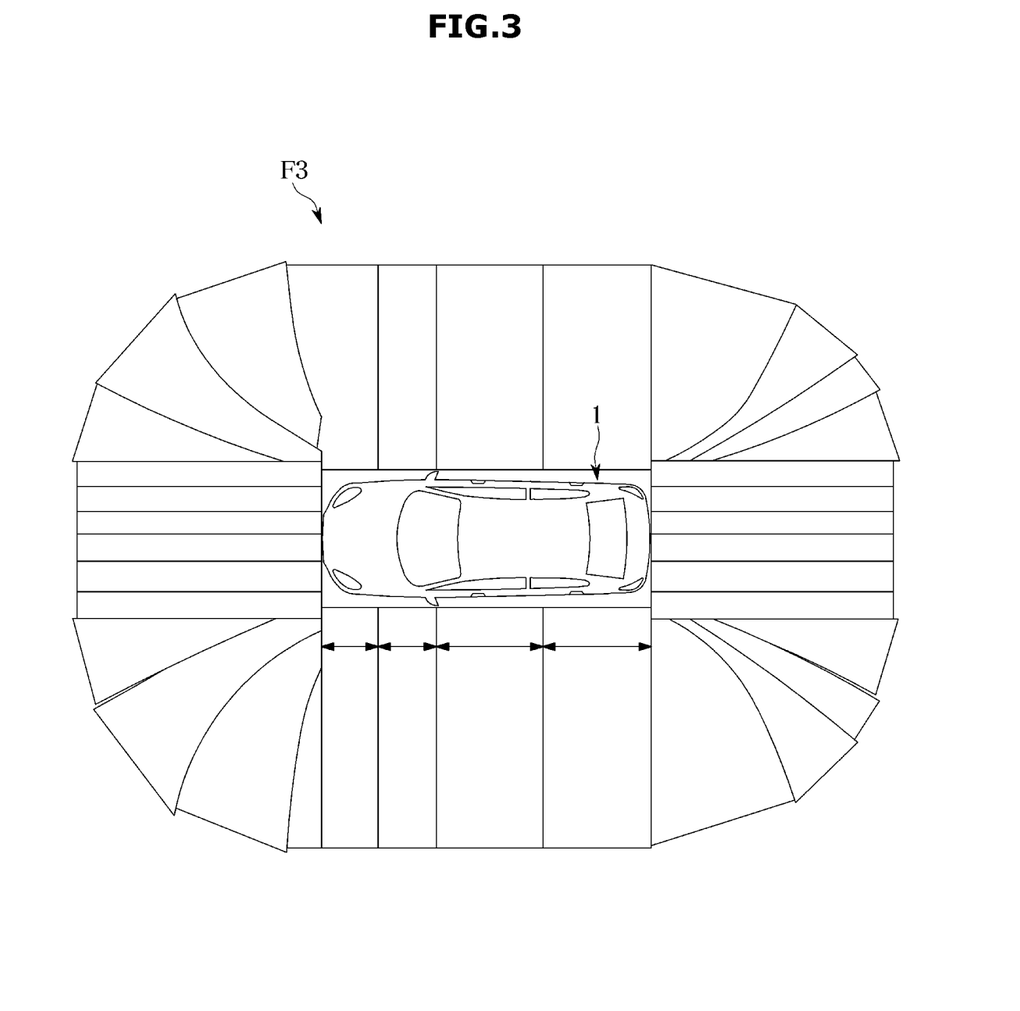
FIG. 3 is a view illustrating map information according to an embodiment.

FIG. 2 is a view for describing an operation of determining map information based on an image around a vehicle according to an embodiment, and FIG. 3 is a view illustrating map information according to an embodiment.

Referring to FIG. 2, it illustrates an external image V2 obtained by the vehicle 1. The cameras 300 provided in the vehicle 1 may be provided at the front, rear, and side surfaces to obtain the image around the vehicle 1.

The controller 200 may match the mask with the obtained image around the vehicle 1.

Meanwhile, in this process, the controller 200 may convert the coordinates of each of the cameras 300 to the coordinates of the vehicle 1. Particularly, a mask M2-1 may be matched to the obstacle such as a vehicle illustrated in the image around the vehicle 1.

In addition, an empty space on the road may be matched with a different mask M2-2.

On the other hand, the floor or ground may be matched with another mask M2-3. The controller 200 may match the mask with the distance information corresponding to each of the pixels.

The controller 200 may determine map information F2 based on this operation.

Meanwhile, in FIG. 2, the map information is derived based on a vehicle image obtained by the camera 300 in response to one camera 300, but each of the cameras 300 provided in the vehicle 1 may perform a corresponding operation.

Meanwhile, when the map information of each of the cameras 300 determined as described above is collected, map information F3 illustrated in FIG. 3 may be finally derived.

The map information may be determined based on a recognition result of the camera 300 and the ultrasonic sensor and a distance coordinate system. The controller 200 may provide a method for providing a free space and a control point for parking control using distance map data for each of the pixels of each of the cameras 300 based on the map information.

The above-described operation may form the map information based on the image of the camera 300 suitable for spatial recognition according to a type of the parking space around the vehicle 1.

The operation minimizes an occlusion of the image and may quickly determine whether to recognize an occupied space.

In addition, the above-described map information may generate an optimal distance map form for recognition by comparing the recognition results of the cameras 300 of different locations.

In addition, it is possible to optimize a control performance by generating the coordinates of an entry point necessary for a subject control.

Meanwhile, the distance map illustrated in FIG. 3 is only an example of the disclosure, and the distance map may be expressed in various forms, and there is no limitation in form.

Figure 4:
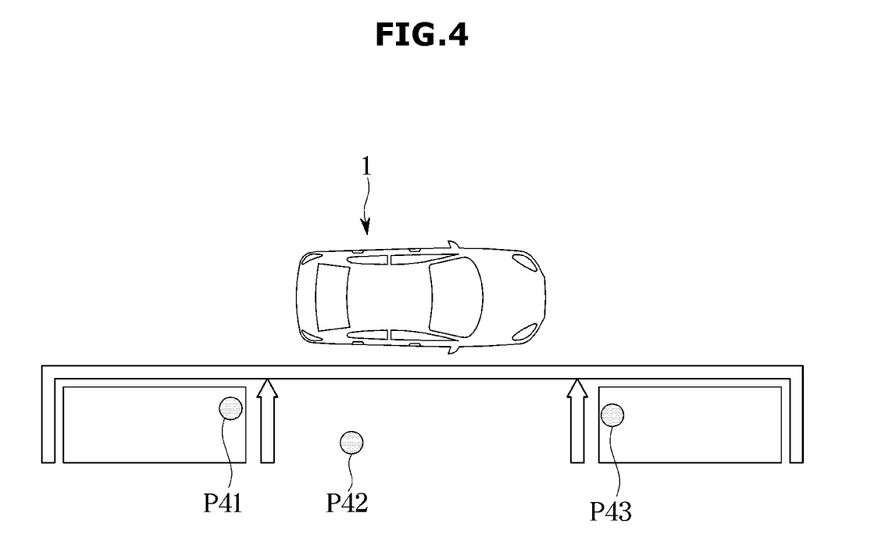
FIG. 4 is a view illustrating that a control point is formed according to an embodiment.

FIG. 4 is a view illustrating that a control point is formed according to an embodiment.

Referring to FIG. 4, as described above, in a case of the map information, the distance information may be included. The controller 200 may control the vehicle 1 by forming control points P41, P42, and P43 of each obstacle instead of the entire obstacle to avoid each control point. That is, in the subject control of the controller 200, it is possible to maximize control efficiency using point information close to a progress of the vehicle 1, rather than using the information of each obstacle. Hereinafter, the surrounding types that are subdivided based on this will be described.

FIGS. 5 to 8 are views for describing a priority of cameras assigned according to a surrounding type.

Figure 5:
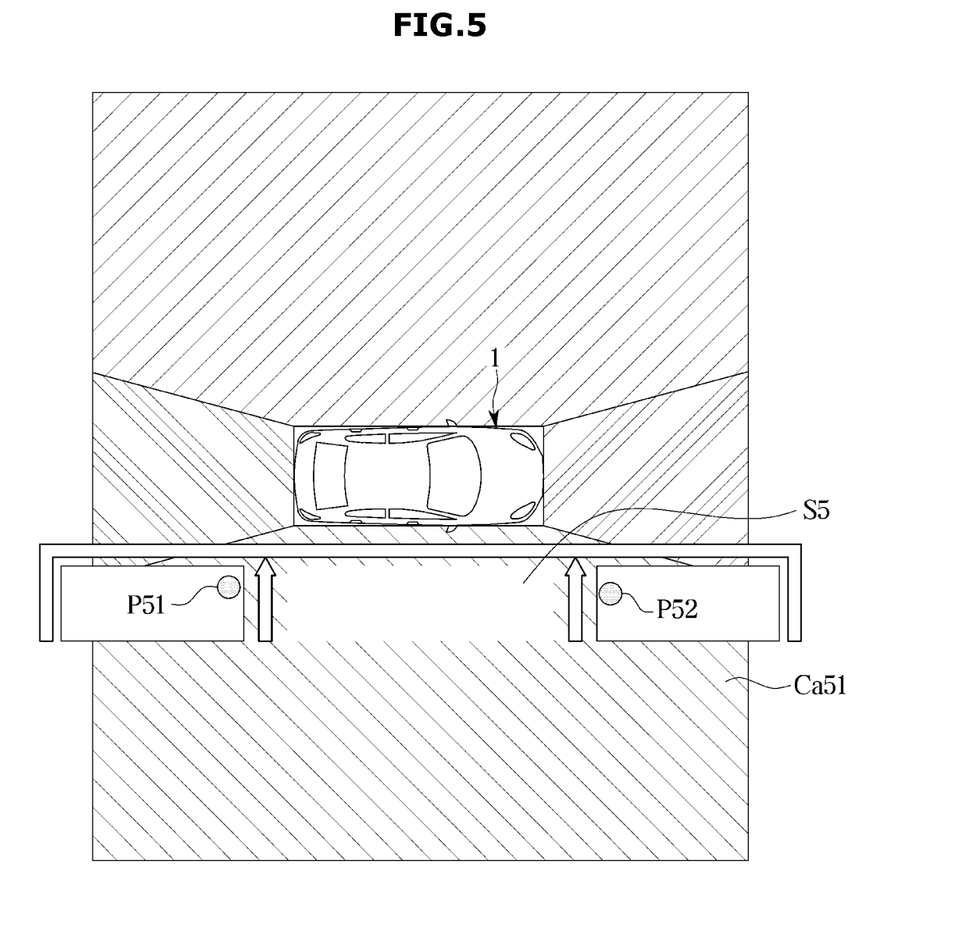
FIGS. 5 to 8 are views for describing a priority of cameras assigned according to a surrounding type.

Referring to FIG. 5, it represents the surrounding type in which a parking space S5 is formed on a right side of the vehicle 1.

Also, the controller 200 may control the vehicle 1 based on two control points P51 and P52. Since the two control points are located on the side of the vehicle, the controller 200 may assign a high priority to the side camera 300. The controller 200 may perform side parking by widening a width of an area Ca51 recognized by the side camera 300.

Figure 6:
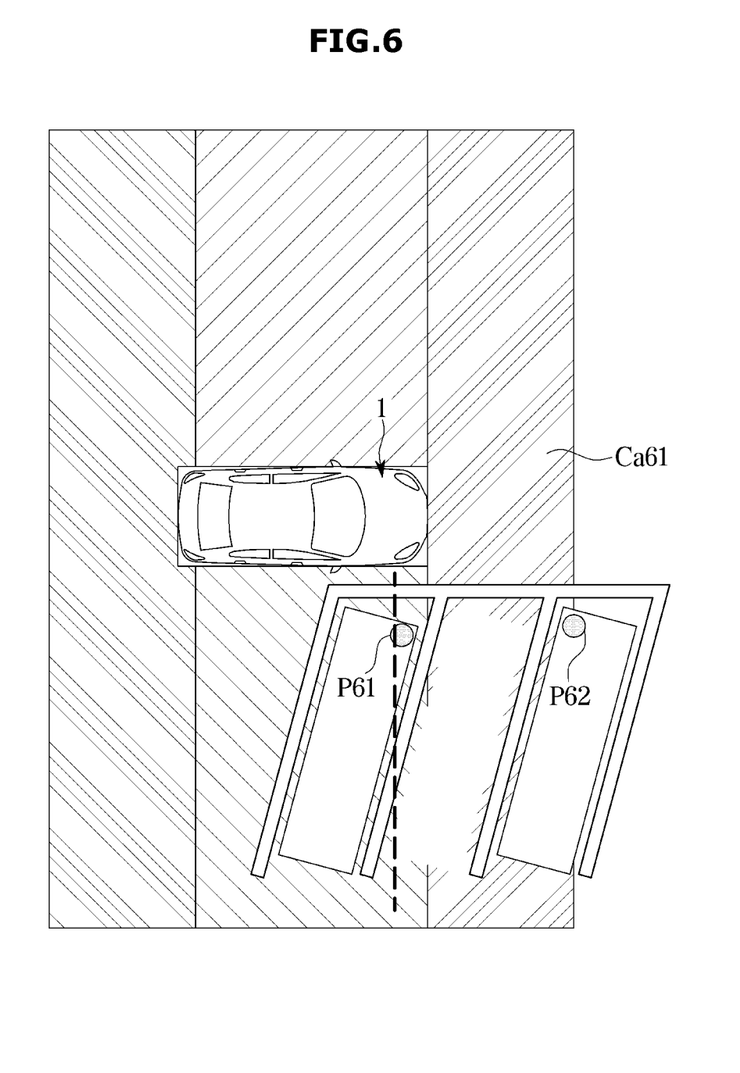

Referring to FIG. 6, a case of the reverse diagonal parking is illustrated.

Even in this case, the controller 200 may control the vehicle 1 based on two control points P61 and P62. Although the two control points are located on the side of the vehicle 1, the two control points are located at positions of the control points different from those of FIG. 5, and therefore, it is necessary to determine a front obstacle to park in the corresponding parking area.

The controller 200 may assign a high priority to the front camera 300. The controller 200 may park in an area Ca6i recognized by the front camera 300.

Figure 7:
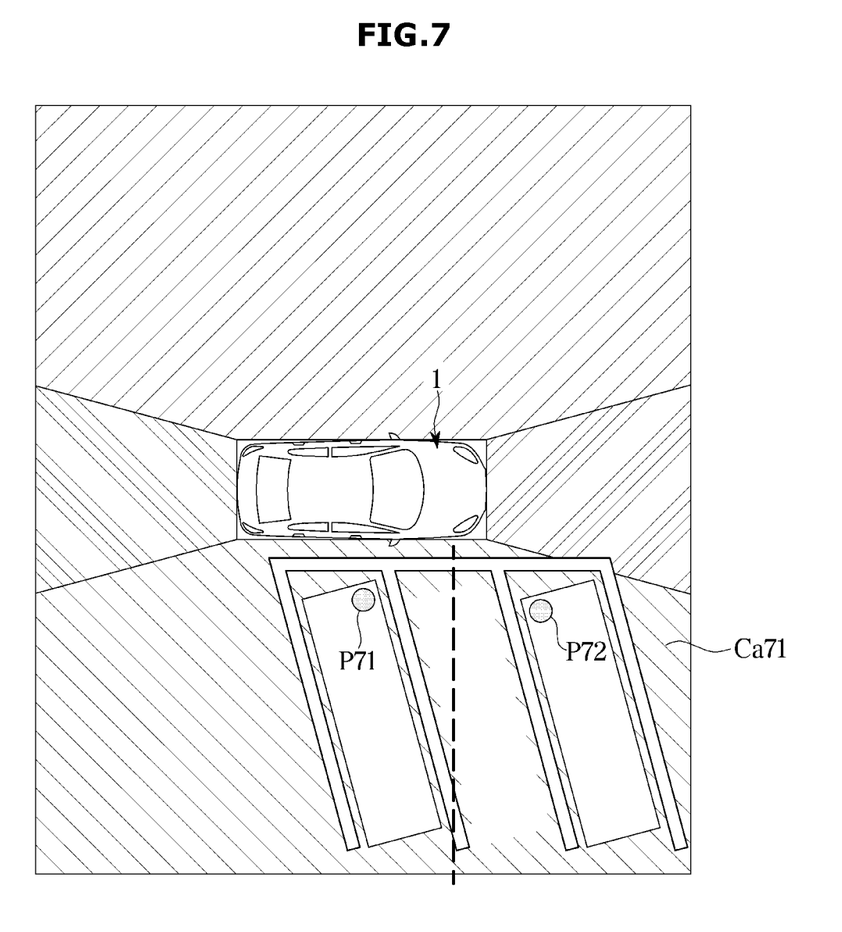

Referring to FIG. 7, a case of forward diagonal parking is illustrated.

Even in this case, the controller 200 may control the vehicle 1 based on two control points P71 and P72. Although the two control points are located on the side of the vehicle 1, the two control points are located at positions of the control points different from those of FIG. 6, and therefore, it is necessary to determine a side obstacle to park in the corresponding parking area.

The controller 200 may assign the high priority to the side camera 300. The controller 200 may park in an area Ca71 recognized by the side camera 300.

Figure 8:
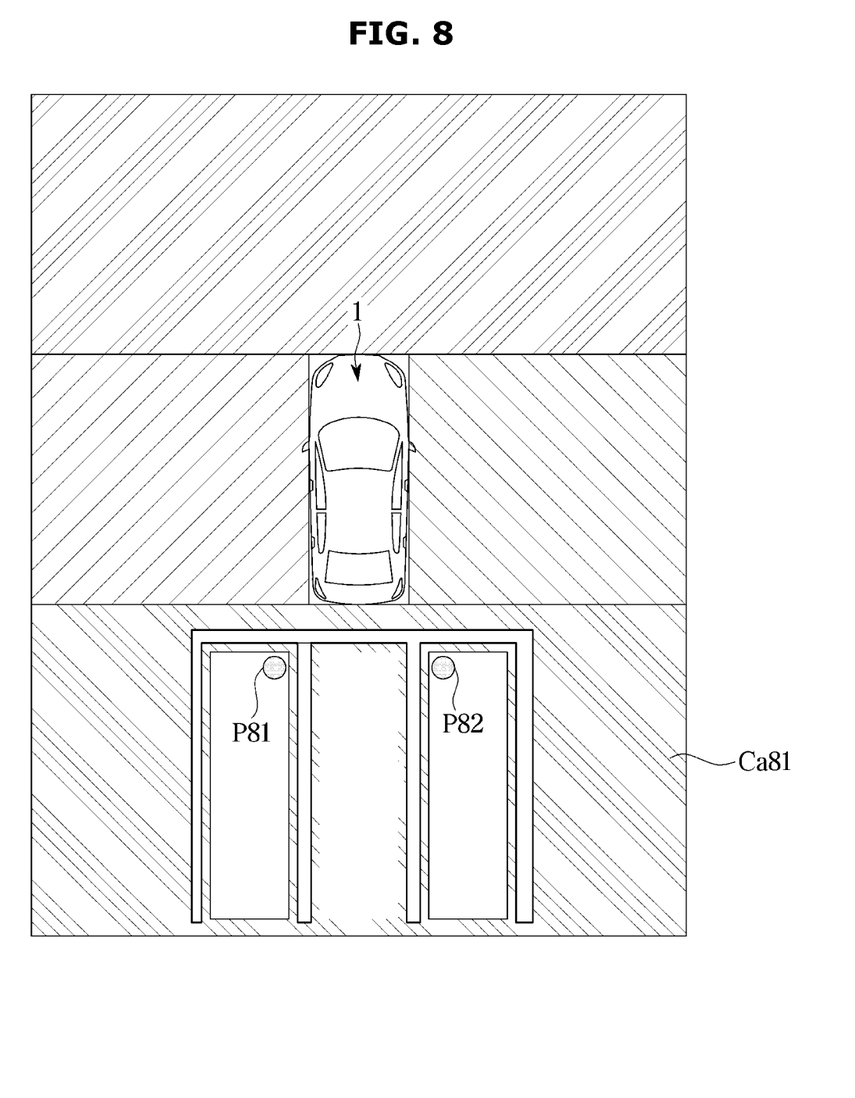

Referring to FIG. 8, it illustrates the surrounding type in which the parking space is at the rear of the vehicle 1.

The controller 200 may control the vehicle 1 based on two control points P81 and P82. Since the two control points are located at the rear of the vehicle, the controller 200 may assign the high priority to the rear camera 300. The controller 200 may perform rear parking by widening the width of the area recognized by the rear camera 300.

On the other hand, in the driving of the vehicle 1, surrounding situations may change in real time, and the position of the vehicle 1 and the control point may also change in real time. Accordingly, the controller 200 may change the priority of the camera 300 by considering a positional relationship between the vehicle 1 and the control point in real time.

Figure 9:
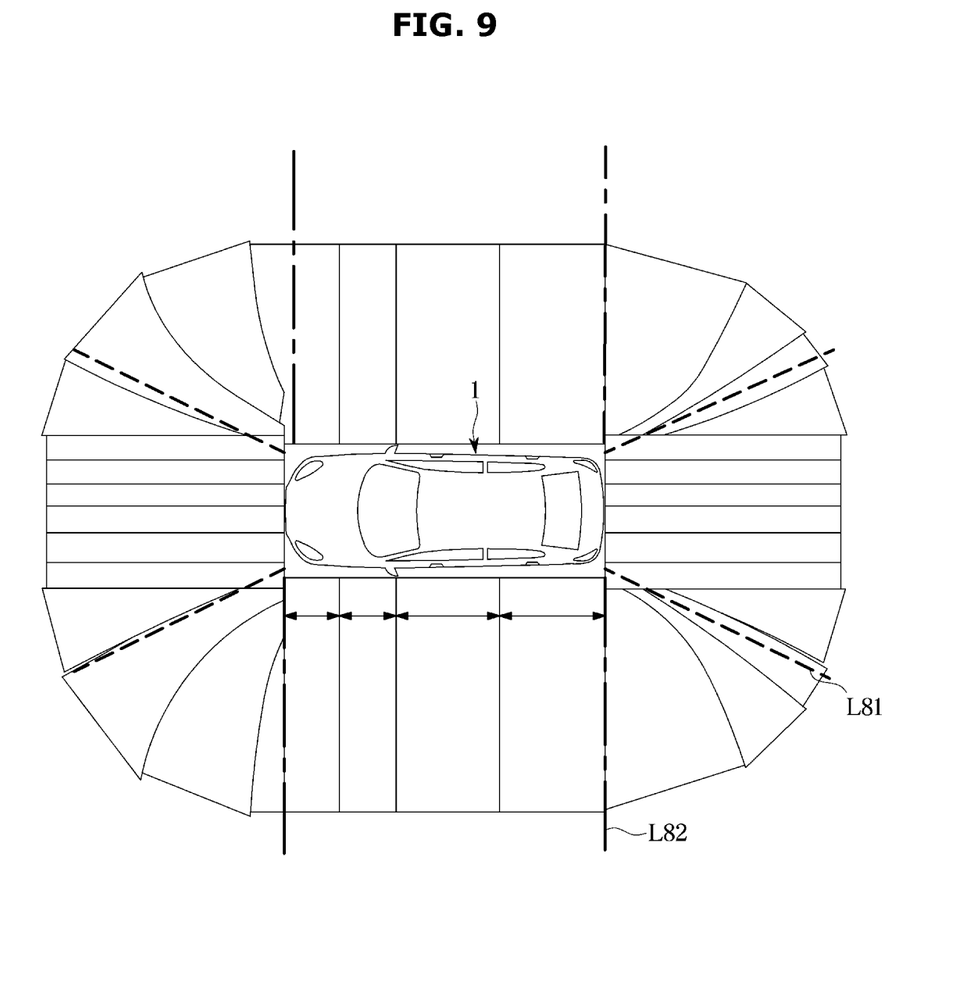
FIG. 9 is a view illustrating that a boundary is formed in a top view image according to an embodiment.

FIG. 9 is a view illustrating that a boundary is formed in a top view image according to an embodiment.

Referring to FIGS. 5 to 8, the recognition area of the camera 300 provided in the vehicle 1 may be changed. Meanwhile, the controller 200 may use information of the plurality of cameras 300 in forming the top view image, and may display the recognition area reflecting the priority of the cameras 300 as the boundary on the top view image.

For example, in the case of FIG. 5 in which the vehicle 1 performs longitudinal side parking, a boundary line L81 having a large recognition area of the side camera 300 may be displayed on the top view image.

On the other hand, when the vehicle 1 performs rear parking as illustrated in FIG. 8, a boundary line L82 having the large recognition area of the rear camera 300 may be displayed on the top view image.

Meanwhile, the above-described operations are only one embodiment for describing the operation of the disclosure, and there is no limitation in the operation of forming the map information according to the distance and changing the priority or the recognition area of the cameras 300 accordingly.

Figure 10:
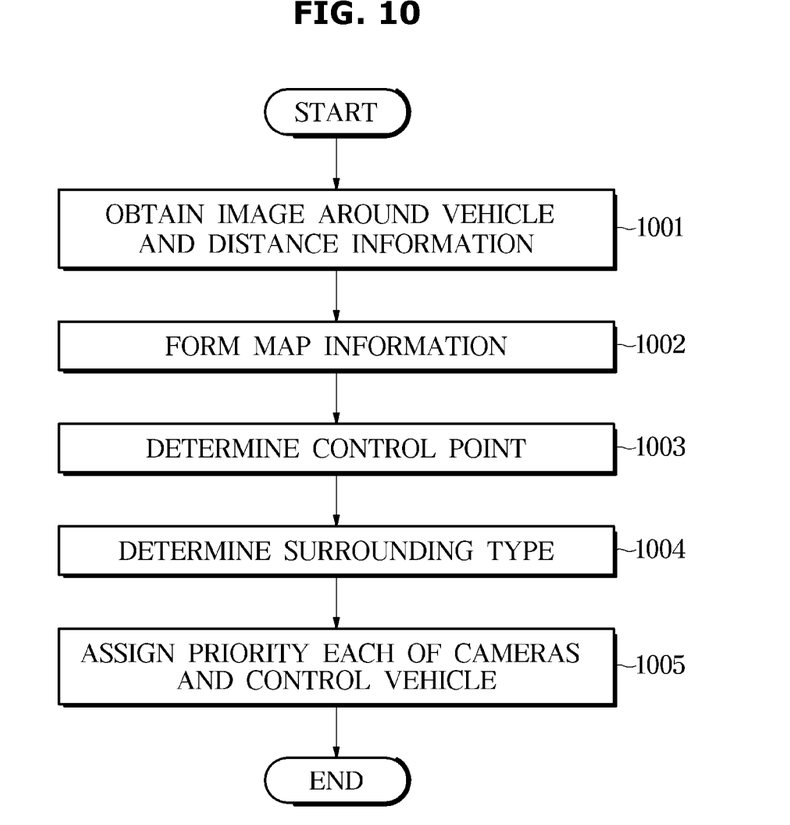
FIG. 10 is a flowchart according to an embodiment.

FIG. 10 is a flowchart according to an embodiment.

Referring to FIG. 10, the vehicle 1 may obtain the image around the vehicle 1 and the distance information (1001).

In addition, the vehicle 1 may form the map information based on the image around the vehicle 1 and the distance information (1002).

In addition, the map information may include the distance information of each obstacle, and the controller 200 may determine the control point based on the distance information of each obstacle (1003).

Also, the controller 200 may determine the surrounding type based on the positional relationship between the vehicle 1 and the control point (1004).

In response to this type, the controller 200 may assign the priority to each of the cameras 300 and control the vehicle 1 based on the recognition area of the camera 300 assigned the priority (1005).

According to the embodiments of the disclosure, the vehicle 1 and the method of controlling the vehicle 1 may change the recognition area of the camera according to the type of parking, thereby enabling efficient autonomous parking.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented as a non-transitory computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A vehicle comprising:
   a display;
   a camera unit disposed in the vehicle, comprising a plurality of cameras;
   a sensing device including an ultrasonic sensor, the sensing device configured to obtain distance information between an object and the vehicle; and
   a controller configured to:
   identify a free space based on images obtained by the plurality of cameras,
   based on the free space, determine a parking direction in which the vehicle is to be parked,
   identify an image corresponding to the parking direction among the images obtained by the plurality of cameras,
   generate a view image based on the identified image and the remaining image among the images obtained by the plurality of cameras, and
   control display of the view image, wherein, when the controlling the display of the view image, the controller is configured to:
  divide a display region of the display into a plurality of regions based on a number of the plurality of cameras, and
  adjust a boundary of a region in which the identified image is displayed so that the region in which the identified image is displayed is displayed larger than each region in which the remaining images are displayed.

2. The vehicle according to claim 1,
  wherein the controller is configured to generate map information based on the distance information between the object and the vehicle obtained by the sensing device, determine at least one control point based on the map information, and control driving to avoid the at least one control point,
  wherein the map information comprises the distance information corresponding to pixels of the images obtained by the plurality of cameras.

3. The vehicle according to claim 1, wherein the controller is configured to convert the images obtained by the plurality of cameras to a vehicle coordinate system to match with a mask.

4. The vehicle according to claim 1, wherein the controller is configured to determine a surrounding type of the vehicle based on the identified free space, wherein the surrounding type further includes a relationship between the object and the vehicle, and a relationship between a road and the vehicle,
  wherein the controller is configured to determine the surrounding type of the vehicle through learning of the images obtained by the plurality of cameras.

5. The vehicle according to claim 4, wherein, when the surrounding type of the vehicle is longitudinal parking on a side of the vehicle, the controller is configured to assign a high priority to a camera on the side of the vehicle among the plurality of cameras.

6. The vehicle according to claim 4, wherein, when the surrounding type of the vehicle is reverse diagonal parking of the vehicle, the controller is configured to assign a high priority to a camera in front of the vehicle among the plurality of cameras.

7. The vehicle according to claim 4, wherein, when the surrounding type of the vehicle is forward diagonal parking of the vehicle, the controller is configured to assign a high priority to a camera on a side of the vehicle among the plurality of cameras.

8. The vehicle according to claim 4, wherein, when the surrounding type of the vehicle is rear parking of the vehicle, the controller is configured to assign a high priority to a camera behind the vehicle among the plurality of cameras.

9. The vehicle according to claim 1, wherein the controller is configured to assign a priority for the plurality of cameras based on the parking direction, and change the priority in real time in response to driving of the vehicle.

10. The vehicle according to claim 9, wherein the controller is configured form a boundary line on the view image based on priority information of the plurality of cameras and output the boundary line to the display.

11. A method of controlling a vehicle, the method comprising:
  obtaining, by a camera unit having a plurality of cameras, images around the vehicle;
  obtaining, by a sensing device, distance information between an object and the vehicle;
  identifying a free space based on images obtained by the plurality of cameras;
  determining a parking direction in which the vehicle is to be parked, based on the free space;
  identifying an image corresponding to the parking direction among the images obtained by the plurality of cameras;
  generating a view image based on the identified image and the remaining image among the images obtained by the plurality of cameras; and
  displaying, by the display, the view image, wherein the controlling the display of the view image includes:
    dividing a display region of the display into a plurality of regions based on a number of the plurality of cameras, and
    adjusting a boundary of a region in which the identified image is displayed so that the region in which the identified image is displayed is displayed larger than each region in which the remaining images are displayed.

12. The method according to claim 11,
  further comprising: generating map information based on the distance information between the object and the vehicle obtained by the sensing device,
  wherein the map information comprises the distance information corresponding to pixels of the images obtained by the plurality of cameras.

13. The method according to claim 11, further comprising converting the images obtained by the plurality of cameras to a vehicle coordinate system to match with a mask.

14. The method according to claim 11,
  further comprising determining a surrounding type of the vehicle based on the identified free space, wherein the surrounding type further includes a relationship between the object and the vehicle, and a relationship between a road and the vehicle,
  wherein obtaining the image around the vehicle comprises determining the surrounding type of the vehicle through learning of the images obtained by the plurality of cameras.

15. The method according to claim 14, wherein obtaining the images obtained by the plurality of cameras comprises giving a high priority to a camera on a side of the vehicle among the plurality of cameras when the surrounding type of the vehicle is longitudinal parking on the side of the vehicle.

16. The method according to claim 14, wherein obtaining the image around the vehicle comprises giving a high priority to a camera in front of the vehicle among the plurality of cameras when the surrounding type of the vehicle is reverse diagonal parking of the vehicle.

17. The method according to claim 14, wherein obtaining the image around the vehicle comprises giving a high priority to a camera on a side of the vehicle among the plurality of cameras when the surrounding type of the vehicle is forward diagonal parking of the vehicle.

18. The method according to claim 14, wherein obtaining the image around the vehicle comprises giving a high priority to a camera behind the vehicle among the plurality of cameras when the surrounding type of the vehicle is rear parking of the vehicle.

19. The method according to claim 11, further comprising assign a priority for the plurality of cameras based on the parking direction, and changing the priority in real time in response to driving of the vehicle.

20. The method according to claim 19, further comprising:

forming a boundary line on the view image based on the priority of the plurality of cameras; and
outputting the boundary line to the display.

\* \* \* \* \*